(12) United States Patent
Gonzalez Sagarzazu et al.

(10) Patent No.: US 8,956,101 B2
(45) Date of Patent: Feb. 17, 2015

(54) SPARE WHEEL STORAGE ASSEMBLY FOR A VEHICLE

(71) Applicant: Batz, S.Coop., Igorre (ES)

(72) Inventors: Ander Gonzalez Sagarzazu, Hendaya (FR); Pedro Corral Rodriguez, Castro Urdiales (ES)

(73) Assignee: Batz, S.Coop, Igoree (ES)

( * ) Notice: Subject to any disclaimer, the term of this patent is extended or adjusted under 35 U.S.C. 154(b) by 147 days.

(21) Appl. No.: 13/705,815

(22) Filed: Dec. 5, 2012

(65) Prior Publication Data
US 2013/0142603 A1 Jun. 6, 2013

(30) Foreign Application Priority Data

Dec. 6, 2011 (ES) .................................. 201131974

(51) Int. Cl.
  *B66D 1/30* (2006.01)
  *B21D 53/26* (2006.01)
  *B62D 43/04* (2006.01)

(52) U.S. Cl.
  CPC .................................. *B62D 43/045* (2013.01)
  USPC ....................................... 414/463; 224/42.23

(58) Field of Classification Search
  USPC ........ 188/69; 192/19; 224/42.1, 42.22, 42.23, 224/42.24, 42.25; 254/323, 375, 376; 414/463; 70/259; 74/55, 575, 577 M, 74/577 R, 577 S
  See application file for complete search history.

(56) References Cited

U.S. PATENT DOCUMENTS

| 138,493 A | * | 5/1873 | Fritts | ............................. 160/306 |
| 2,278,681 A | * | 4/1942 | Thul | ............................. 254/376 |

(Continued)

FOREIGN PATENT DOCUMENTS

| EP | 1724231 A1 | 11/2006 |
| EP | 1724231 B1 | 11/2006 |

(Continued)

OTHER PUBLICATIONS

Extended European Search Report and Opinion of the International Searching Authority. EP Application No. 12382435.1, issued by the European Patent Office, mail date Sep. 3, 2013, pp. 1-4. Rijswijk, Netherlands.
Search Report and Written Opinion, dated Oct. 8, 2013 and performed by the Spanish Patent Office for Spanish application No. 201131974, filing date Dec. 6, 2011, Madrid Spain.

(Continued)

*Primary Examiner* — Gregory Adams
(74) *Attorney, Agent, or Firm* — Tim Kitchen; Peter B. Scull; Hamilton DeSanctis & Cha LLP

(57) ABSTRACT

Unit for picking up spare wheels in vehicles that includes a winding assembly with a rotating shaft, the rotating shaft having a gear with a plurality of spaced-apart teeth circumferentially disposed about the rotating shaft. The unit further includes a safety device that includes a spring loaded cam that is pivotable between first and second angular positions. The cam includes an engaging portion that is configured to engage with the spaced-apart teeth on the rotating shaft. In the first angular position the engaging portion of the cam is urged towards the gear of the rotating shaft by action of a spring element so that the engaging portion resides in a space between the spaced-apart teeth to prevent rotation of the rotating shaft. In the second angular position the engaging portion of the cam is positioned away from the gear of the rotating shaft against the action of the spring element so that the engaging portion does not engage with the spaced-apart teeth to permit rotation of the rotation shaft.

16 Claims, 6 Drawing Sheets

(56) References Cited

U.S. PATENT DOCUMENTS

| | | | | |
|---|---|---|---|---|
| 3,539,152 A | * | 11/1970 | Paul | 254/323 |
| 3,540,306 A | * | 11/1970 | Nurmse | 74/576 |
| 3,734,323 A | | 5/1973 | Price et al. | |
| 3,776,517 A | * | 12/1973 | Davis et al. | 254/332 |
| 3,856,167 A | | 12/1974 | Yasue et al. | |
| 4,600,352 A | * | 7/1986 | Ivan | 414/463 |
| 4,693,453 A | * | 9/1987 | Ivan | 254/323 |
| 5,290,014 A | * | 3/1994 | Fergison, Jr. | 254/342 |
| 5,368,280 A | * | 11/1994 | Ng | 254/376 |
| 5,524,870 A | * | 6/1996 | Tallent et al. | 254/365 |
| 5,575,457 A | * | 11/1996 | Inoue et al. | 254/368 |
| 6,267,546 B1 | | 7/2001 | Oxyer et al. | |
| 6,527,252 B2 | * | 3/2003 | Dziedzic | 254/323 |
| 6,644,630 B1 | | 11/2003 | Lorenz | |
| 7,686,061 B2 | * | 3/2010 | Mullet et al. | 160/191 |
| 2002/0066894 A1 | | 6/2002 | Dobmeier et al. | |
| 2012/0325870 A1 | * | 12/2012 | Rodriguez et al. | 224/42.23 |

FOREIGN PATENT DOCUMENTS

| | | |
|---|---|---|
| EP | 2070808 A1 | 6/2009 |
| ES | 2365544 T3 | 10/2011 |
| FR | 2813299 A1 | 3/2002 |
| GB | 214447 A | 4/1924 |
| GB | 1120909 A | 7/1968 |
| GB | 1185550 A | 3/1970 |
| GB | 2433060 A | 6/2007 |
| JP | S497668 U | 1/1974 |
| KR | 20010048652 A | 6/2001 |
| KR | 20020082014 A | 10/2002 |

OTHER PUBLICATIONS

Search Report and Written Opinion, dated Oct. 8, 2013 and performed by the Spanish Patent Office for Spanish application No. 201131974, filing date Dec. 6, 2011, Madrid Spain (partial translation of written opinion in English).

* cited by examiner

US 8,956,101 B2

SPARE WHEEL STORAGE ASSEMBLY FOR A VEHICLE

CROSS-REFERENCE TO RELATED APPLICATIONS

This application relates to and claims the benefit and priority to Spanish Patent Application No. P201131974, filed Dec. 6, 2011.

TECHNICAL FIELD

The invention relates to units for picking up spare wheels in vehicles.

BACKGROUND

There are known units in the prior art for picking up spare wheels designed for their use on vehicles, and more specifically units designed in picking up or releasing a spare wheel which is disposed beneath the chassis (or on the underside) of the vehicle.

These units comprise a main shaft connected to the wheel and supporting it, a mechanism with a power shaft, which may be of different types, which allow a cable to be wound or released when the user acts on the power shaft with a tool, the cable being connected at one end to the main shaft and at the other to the mechanism, said mechanism withstanding the tension transmitted by the cable due to the weight of the wheel, and the mechanism being designed so that the power shaft is locked, and its movement therefore being irreversible, and it only being able to rotate again in any direction when the user acts on it with the tool. The units also comprise a safety device that is activated when the tool stops acting on the power shaft.

U.S. Pat. No. 6,267,546 discloses a unit of this type. Said unit comprises a main shaft with a support for the wheel, a mechanism connected to the main shaft acted on by the user with a tool, with a cable for raising or lowering said main shaft, and therefore the wheel, between an upper position and another lower position, and a safety device. Said safety device comprises a sliding bolt adapted to support the main shaft, and therefore the wheel, and an actuator adapted to selectively move the bolt between a locking position in which the safety device supports the main shaft, and an unlocking position in which the movement of said shaft is released. The safety device is always in an active position, and the bolt is in the locking position, and therefore supporting the main shaft, when the tool is not acting on the mechanism.

SUMMARY OF THE DISCLOSURE

According to one implementation a unit for picking up spare wheels is provided for use in vehicles, and more specifically for its use in picking up or releasing spare wheels in vehicles in which the spare wheel is housed on the underside of the vehicle. In one implementation the unit comprises a main shaft connected to the wheel supporting its weight; a mechanism with a power shaft that comprises a plurality of members and transmits a leading power, which allows it to wind or release a cable when the user acts on said power shaft with a tool. The cable is connected at one end to the main shaft and at the other to the mechanism, said mechanism withstanding the tension transmitted by the cable due to the weight of the wheel. The mechanism is designed in such a way that the power shaft of the mechanism may only rotate in any direction when the user acts on it with the tool designed for that purpose, and for as long as this does not happen the power shaft is locked, its movement is, in theory, irreversible and the wheel does not move. The unit also comprises a safety device that is connected to the mechanism, which moves to an active position when the tool stops acting on the power shaft. The safety device, when it is in the active position, cooperates with the mechanism through the power shaft and when the locking of the power shaft fails and it begins to rotate, said safety device acts on the power shaft, locking its rotation.

When it is travelling the vehicle is subjected to movements which cause stresses that are transmitted to the unit for picking up spare wheels, and are therefore transmitted to the mechanism. These stresses are impacts and/or vibrations that are accentuated when the user has not totally secured the wheel against the underside of the vehicle, and there is a distance between the upper part of the wheel and the lower part of the vehicle. Known mechanisms with a power shaft are, in theory, irreversible in their rotation, although due to these impacts and vibrations it has been shown that this irreversibility can become reversible and the power shaft may rotate releasing the cable, namely the cable that supports the main shaft and therefore the wheel, while also possibly releasing the safety device that supports the main shaft. When these situations arise the unit, which comprises the safety device—which is in the active position—comes into action, as the mechanism, which in theory is irreversible, may become reversible, locking the rotation of the power shaft when there is a failure in the locking of the power shaft and it has therefore started to rotate, and thereby preventing any movement of the power shaft from the very start.

Other advantages deriving from the unit are that this unit is compatible with many mechanisms with an existing power shaft, and capable of use with multiple types of power shafts regardless of whether the unit is disposed or otherwise with an additional safety device to support the main shaft. Furthermore, as it is a unit with few members and simple in design, the cost is reduced and its arrangement in the mechanism simplified. Additionally, another advantage it provides in terms of cost is that the safety device for supporting the main shaft may be removed, if the customer so wishes, as the unit with said safety device is effective and produces irreversibility of the movement of rotation, as the action of the device is caused on the power shaft itself.

According to other implementations, an apparatus for storing a spare wheel on a motor vehicle is provided that comprises: a first mechanism attached to the motor vehicle comprising a vertically disposed main shaft that is adapted to support the load of the spare wheel, the main shaft moveable between a first vertical position where the spare wheel is in a stored position and second vertical position lower than the first vertical position where the spare wheel is in an accessible position; a second mechanism comprising a winding assembly having a rotating shaft with a first end adapted to receive a tool, the rotating shaft rotatable upon the application of a rotational force applied by the tool, the rotating shaft comprising a gear with spaced-apart teeth circumferentially disposed about the rotating shaft; the first and second mechanisms coupled by a cable having a first end and a second end, the first end of the cable coupled to the main shaft of the first mechanism, the second end of the cable coupled to the winding assembly of the second mechanism, the cable capable of being wound in the second mechanism upon a rotation of the rotating shaft in a first direction to move the main shaft of the first mechanism towards the first vertical position, the cable capable of being unwound in the second mechanism upon a rotation of the rotating shaft in a second direction opposite the first direction to move the main shaft of the first mechanism towards the second vertical position; the apparatus further comprising a safety device that is capable of assuming an active position and a non-active position, the safety device comprising a cam that is pivotable about an axis between a first angular position that corresponds to the active position and a second angular position that corresponds to the non-active position, in the first angular position an engaging portion of the cam is urged towards the gear of the rotating shaft by action of a spring element so that the engaging portion resides in a space between the spaced-apart teeth to prevent rotation of the rotating shaft in at least the second direction, in the second angular position the engaging portion of the cam is positioned away from the gear of the rotating shaft against the action of the spring element so that the engaging portion does not engage with the spaced-apart teeth to permit rotation of the rotation shaft in at least the second direction.

These and other advantages and characteristics will be made evident in the light of the drawings and the detailed description thereof.

DETAILED DESCRIPTION

Figure 1:
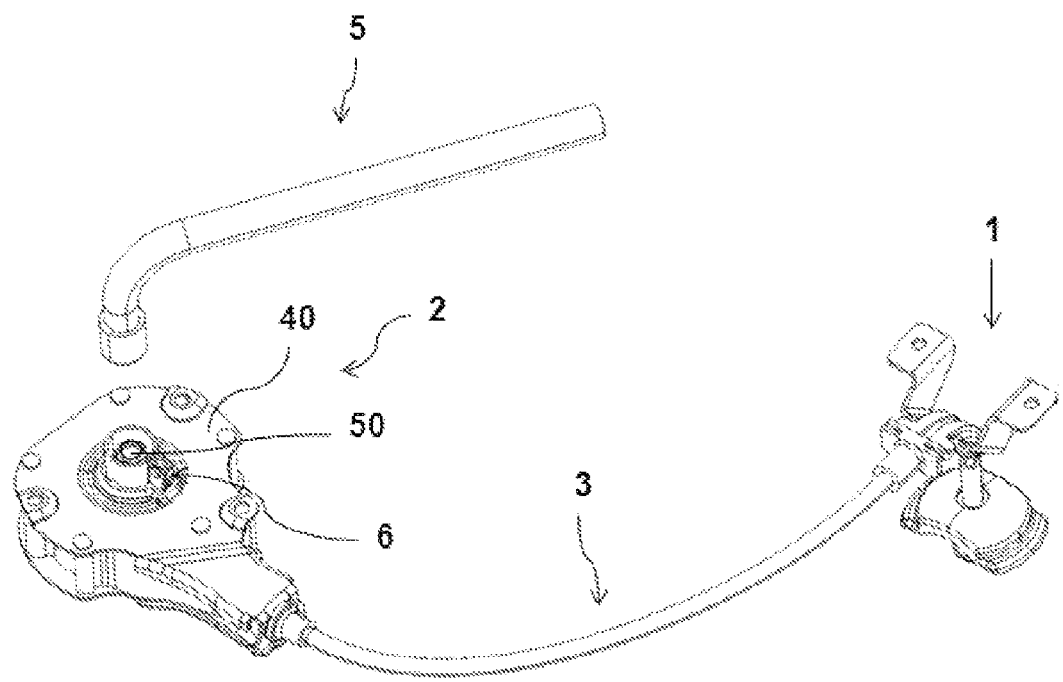
FIG. 1 shows a perspective view of one implementation of the unit with the safety device in an active position.

FIG. 1 shows a perspective view of an implementation designed to wind or release a spare wheel of a vehicle, which is disposed beneath the chassis (or on the underside) of the vehicle. The unit comprises a main shaft 1 connected to the wheel, said main shaft 1 extending vertically to pass through a central hole of the wheel (not shown in FIG. 1), and said main shaft 1 comprising a support on which the wheel is supported.

Figure 2:
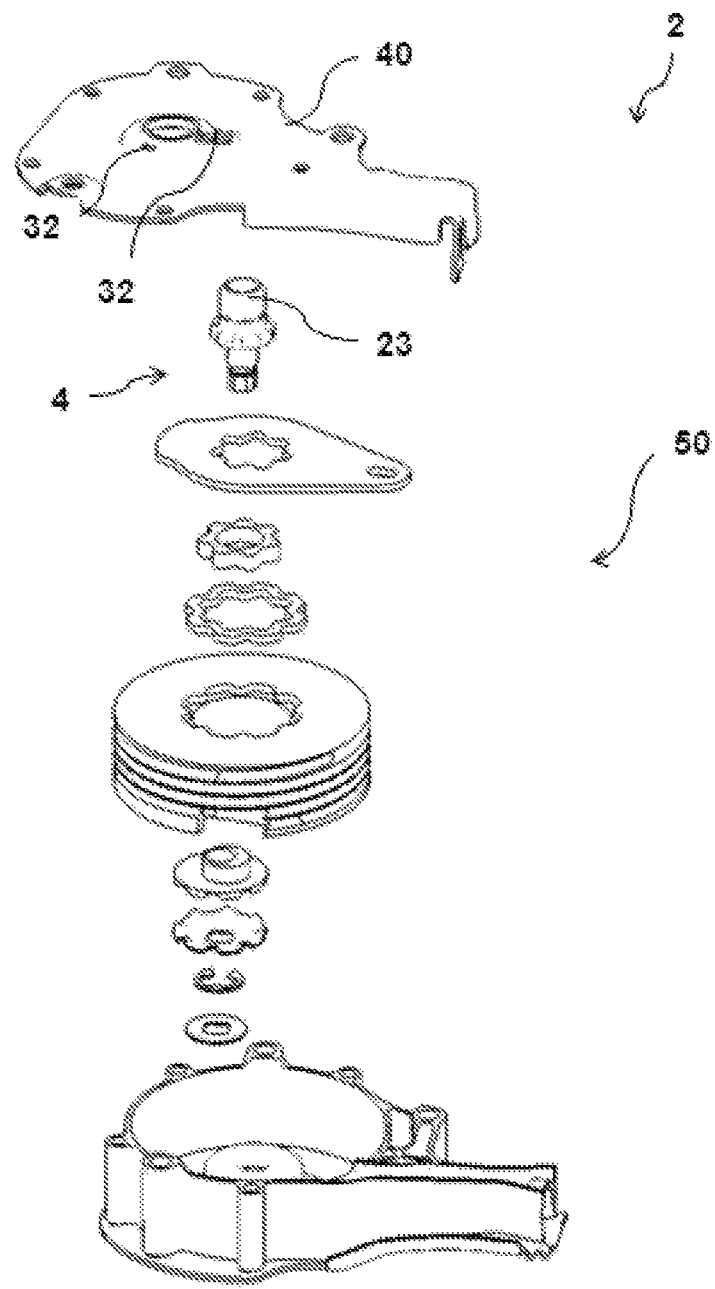
FIG. 2 shows a perspective view of the individual parts of the mechanism of the implementation of FIG. 1.

The unit also comprises a mechanism 2, and as can be seen in FIG. 2, said mechanism 2 comprises a power shaft 50. A power shaft is understood as any object especially designed to transmit power, and in the mechanisms of units for picking up spare wheels in vehicles it is, in particular, a shaft that transmits a drive force and is subjected to torque requests due to the transmission of a pair of forces: the incoming force due to the weight of the wheel, and the outgoing force on the shaft being acted on by the user with the tool. Power shafts may be of various types, being capable of being of an eccentric cam, a worm gear with helicoidal mesh, a coiled spring in the gear shaft, etc. In the mechanism 2, in one implementation the power shaft 50 is of the eccentric-cam type, comprises a plurality of members that rotate around an imaginary coaxial shaft, and transmits a drive force, which allows a cable 3 to be wound or released when the user uses a tool 5 to act on said power shaft 50. The term "cable" should be understood as any type of flexible connection member suitable for performing the function of transmitting the tension due to the weight of the wheel.

Said cable 3 is connected at one end to the main shaft 1 and at the other to the mechanism 2, with the result that said mechanism 2 withstands the tension of the cable 3 due to the weight of the wheel. The power shaft 50 comprises, among other members, an eccentric cam, a drum for winding and releasing the cable 3, a plurality of meshes with a reducing effect that allows the torque requested at the intake of the power shaft 50 due to the weight of the wheel to become a much smaller torque at the outlet, which allows the user to use the mechanism 2 by means of the tool 5, and a drive shaft 4 that transmits the torque to the outlet of the power shaft 50, and on the end of which is housed the tool 5. The power shaft 50 is designed in such a way that the configuration of the members of which it is comprised make it irreversible, with the result that they ensure that when the cable 3 is wound as a result of it being acted on by the user with the tool 5, it does not move back due to the tension caused on the cable 3 due to the weight of the wheel, and the mechanism 2 is locked. In this situation the power shaft 50 may only rotate when it is acted on with the tool 5.

In one implementation the unit also comprises a safety device 6 connected to the mechanism 2. This safety device 6 moves to an active position, and is therefore in a situation in which it may cause an action when the tool 5 stops acting on the power shaft 50. The safety device 6 of the unit, when it is in an active position and therefore when the tool 5 is not acting on the power shaft 50, cooperates with the mechanism 2 when the locking of the power shaft 50 fails, for example, due to the vibrations to which the vehicle is subjected and the wheel is not totally in its housing position. The power shaft may then begin to rotate, and it is at this point that the safety device 6 acts on said power shaft 50 and locks its rotation, preventing the wheel from falling on the ground.

Figure 3:
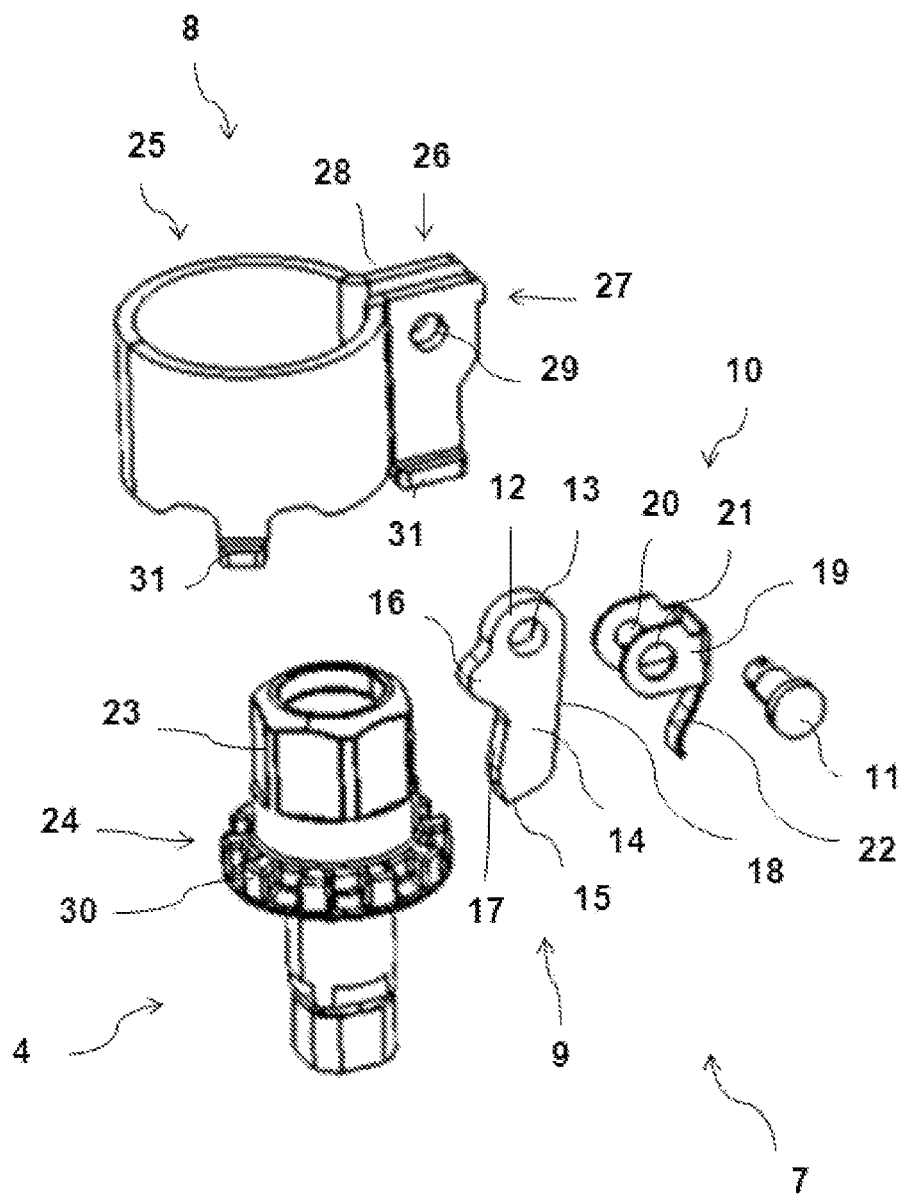
FIG. 3 shows a perspective view of the individual parts of the safety device of the implementation of FIG. 1.

As shown in FIG. 2, the drive shaft 4 of the power shaft 50 comprises an end 23 adapted to house the end of the tool 5, the safety device 6 acting on said drive shaft 4 in the active position. FIG. 3 shows how the safety device 6 of the unit comprises in one implementation a pawl mechanism 7 and a drive guide 8 disposed on the cover 40 of the mechanism 2, with the result that the end 23 of the drive shaft 4 projects out of said cover 40. The pawl mechanism 7 acts on the drive shaft 4 when the safety device 6 is in the active position. Said pawl mechanism 7 comprises a cam 9, a spring unit 10 and a shaft 11 that connects the cam 9 and the spring unit 10 to the drive guide 8. The drive shaft 4 also comprises a crown gear 24 disposed next to and beneath the end 23, surrounding the drive shaft 4, being connected to it. The crown gear 24 comprises a plurality of teeth 30 and is disposed beneath the cover 40, and the cam 9 acts on said crown gear 24 when the safety device is in the active position.

The spring unit 10 of the pawl mechanism 7 is a piece that allows the support of the cam 9, surrounding it, and comprises two differentiated parts, a U-shaped connection member 19 in which there are disposed substantially circular housings 20 and 21 on and extending through each one of the lateral faces of the U-shaped connection member 19, the connection shaft 11 being housed in said housings 20 and 21. The spring unit 10 comprises a second part connected tightly to the connection member 19, which is a spring 22. Said spring 22 is a piece that in one implementation is a metal strip made of spring steel or a material of similar characteristics, which is connected at one end to the base of the U of the connection member 19 and at the other end is supported on a lateral face 18 of the cam 9. The spring 22 exerts a force on said cam 9 in the direction of the lateral face 18, allowing said cam 9 to swing around the shaft 11 that connects the cam 9 to the spring unit 10.

In one implementation the cam 9 is a substantially flat piece with an elongated shape, which comprises a first end 12 next to which there is disposed a substantially circular housing 13 that passes through the cam 9, in which is housed the shaft 11. Beside the housing 13 and extending along the cam 9 is comprised an arm 14, which presents a second end 15 on the opposite end of the first end 12 of the cam 9, and a projection 16 that is disposed on a lateral face 17, opposite the lateral face 18 of said arm 14. In the positioning of the safety device 6 on the cover 40 of the mechanism 2, the cam 9 is positioned vertically and passes through the cover 40, the projection 16 being disposed projecting out of the cover 40, and the second end 15 remaining beneath the cover 40. The teeth 30 of the crown gear 24 are disposed facing the position of the second end 15 of the cam 9, beneath the cover 40. As a result, and due to the force exerted by the spring 22 of the spring unit 10, when the safety device 6 is in the active position the second end 15 of the cam 9 connects to the crown gear 24, it being capable of being housed in the gap between two of the teeth 30 of the crown gear 24.

The drive guide 8 of the safety device 6 is a piece that allows the tool 5 to be guided when the user decides to act on the mechanism 2 of the unit by means of the power shaft 50, and also allows the spring unit 10 to be supported along with the cam 9. Said drive guide 8 comprises two differentiated parts: a cylindrical guide 25 whose inner body is hollow and which allows the end 23 of the drive shaft 4 to be housed, surrounding it, and two substantially flat supports 26 and 27 that project out of a lateral opening of the cylindrical guide 25 and run along the height of said cylindrical body. Said supports 26 and 27 are disposed with substantially circular housings 28 and 29 on and extending through each of their lateral faces next to the upper part of said lateral faces, with the result that the cam 9 is housed in a vertical position between the two supports 26 and 27, and the spring unit 10 holds, with the connection member 19, the two supports 26 and 27. The housing 13 of the cam 9, the housings 20 and 21 of the connection member 19, and the housings 28 and 29 of the supports 26 and 27 coincide when the cam 9 and the spring unit 10 are positioned in the supports 26 and 27, and the connection shaft 11 of the drive guide 8 is inserted through said housings. The drive guide 8, as it forms part of the safety device 6, is disposed on the cover 40 of the mechanism 2, and is connected in one implementation to the cover 40 by means of a plurality of flaps 31 disposed in the lower area of the cylindrical guide 25 and the supports 26 and 27. Additionally, and in order to make the connection rigid, in one implementation the cover 40 comprises a plurality of holes 32, with the result that the connection is performed by inserting the flaps 31 in the holes 32 and folding said flaps 31 on the cover 40 in a process that may be a stamping process.

Figure 4:
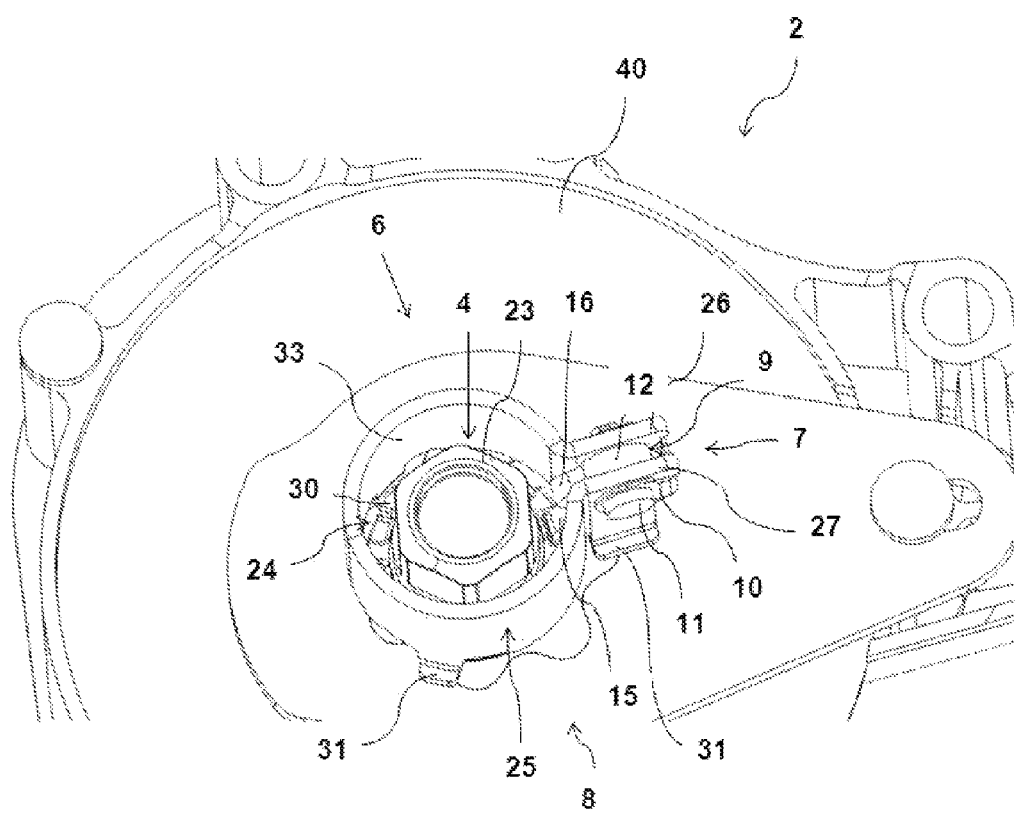
FIG. 4 shows a perspective view of the safety device of the implementation of FIG. 1, in an active position and fitted on the mechanism without a cover.
Figure 5:
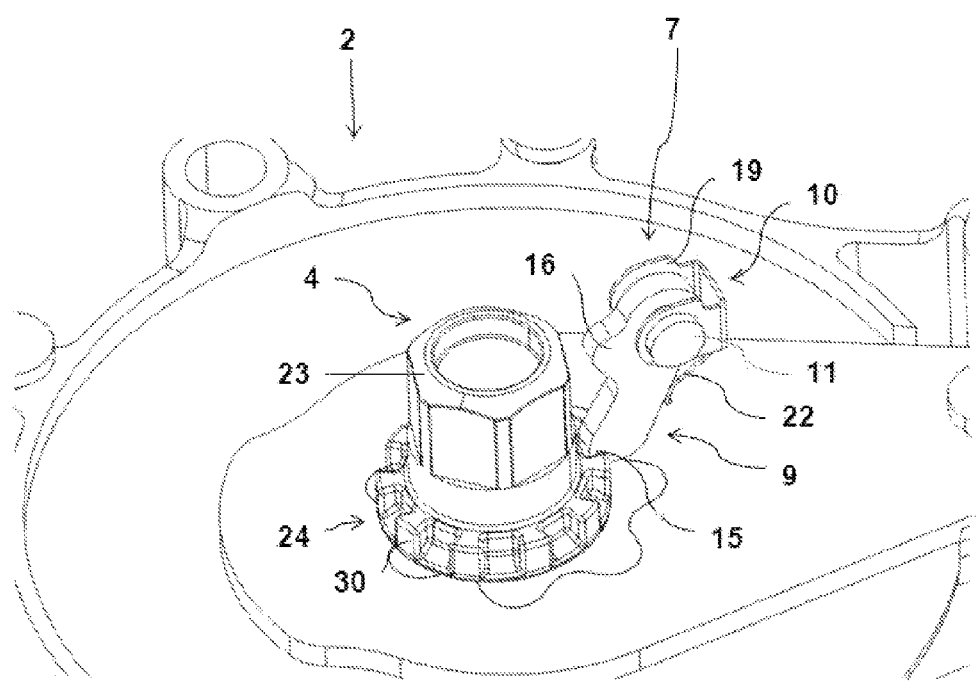
FIG. 5 shows a perspective view of the pawl mechanism of the safety device of the implementation of FIG. 1, in an active position on the drive shaft of the mechanism without a cover.

FIG. 4 shows a perspective view of the safety device 6 of the unit, having been eliminated from said view the cover 40 of the mechanism 2 in order to show both the cylindrical guide 25 and the supports 26 and 27 with the flaps 31 folded, and the complete assembly of the safety device 6 with the drive shaft 4 in view. In this situation the end 23 of the drive shaft 4 is free without the tool 5 acting on it, and said end 23 is surrounded by the cylindrical guide 25. The cam 9 with the second end 15 is housed in the gap between two teeth 30 of the crown gear 24, as a result of which the safety device 6 is in the active position, cooperating with the mechanism 2 through the drive shaft 4 of the power shaft 50. As can be seen in FIG. 4, between the inner diameter of the cylindrical guide 25, and the outer diameter of the end 23 of the drive shaft 4 there is a space 33 that allows the end of the tool 5 to be housed, by sliding it. FIG. 5 shows a perspective view of the pawl mechanism 7 of the safety device 6 of the unit, without the cover 40 and without the drive guide 8. The tool 5 is not acting on the end 23 of the drive shaft 4, with the result that due to the elastic action of the spring 22 that exerts a pushing force on the cam 9, the second end 15 of said cam 9 connects to the crown gear 24, said second end 15 being disposed pushing against the crown gear 24, preferably between two consecutive teeth 30, and the projection 16 being disposed in the space 33 between the cylindrical guide 25 and the end 23 of the drive shaft 4, as shown in FIG. 4. In said situation the safety device 6 is in the active position, but does not act against the rotation of the drive shaft 4 of the power shaft 50, because in normal situations with the wheel being picked up it locks said rotation, preventing the movement of the cable 3, and the drive shaft 4 does not move.

Figure 6:
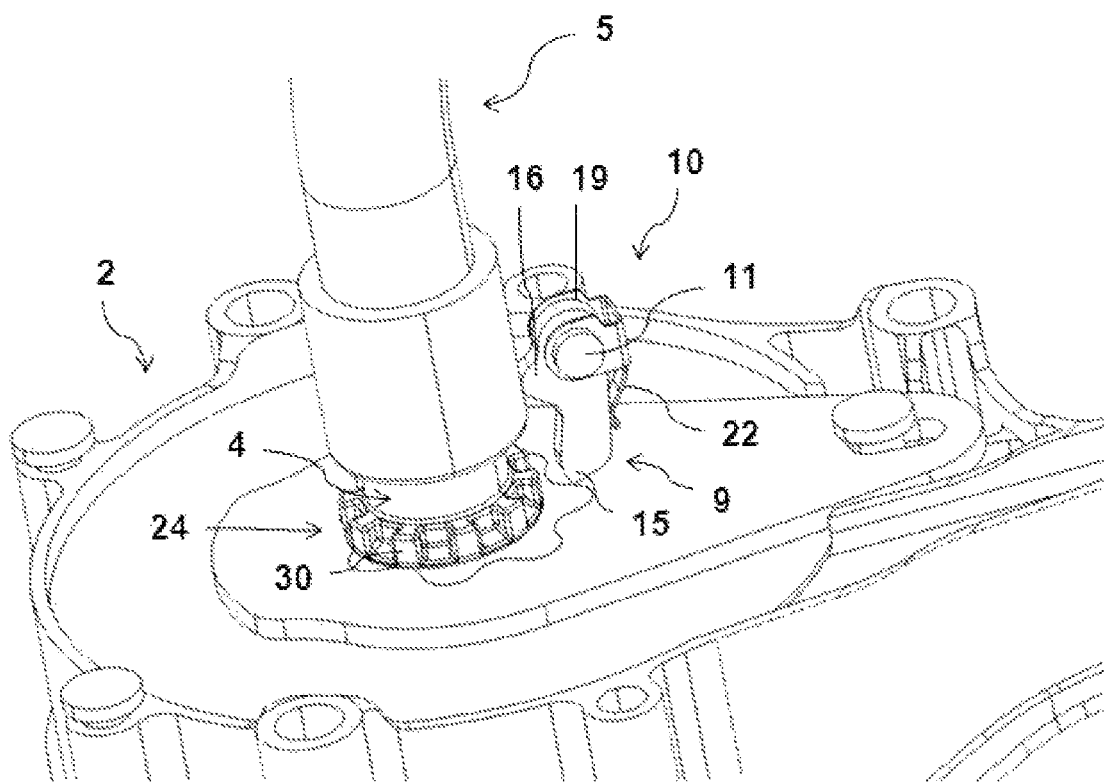
FIG. 6 shows a perspective view of the pawl mechanism of the safety device of the implementation of FIG. 1, in a non-active position on the drive shaft of the mechanism without a cover.

FIG. 6 shows a perspective view of the pawl mechanism 7 of the safety device 6 of the unit without the cover 40 and without the drive guide 8. In this case the tool 5 is acting on the end 23 of the drive shaft 4, with the result that as the end of said tool 5 slides along the space 33 it encounters the projection 16. The user continues pushing the tool 5 until the end 23 of the drive shaft is completely housed in the end of the tool 5, and the projection 16, on being pushed by the tool 5 moves, overcomes the pushing force of the spring 22, and moves the cam 9 in its entirety. As a result, the second end 15 of the cam 9 moves, disconnecting itself from the crown gear 24. In said situation the safety device 6 is in a non-active position, releasing the drive shaft 4 of the power shaft 50 from the passive locking in which it found itself in the active position of the safety device 6, and the user may rotate the tool 5 to wind or release the cable 3, and with it the wheel.

It is known that due to, for example, impacts and vibrations in the movement of the vehicle, above all when the user has not totally picked up the wheel and there is a space between said wheel and the chassis of the vehicle, the irreversibility of the power shaft 50 fails and said shaft becomes reversible, it being capable of rotating and transferring the rotation to the drive shaft 4, releasing cable and causing the wheel to fall to the ground. In these cases, when the tool 5 is not acting on the drive shaft 4 and therefore the safety device is in the active position and the power shaft 50 is in passive locking, if said power shaft 50 fails and becomes reversible and the drive shaft 4 starts to rotate, the second end 15 of the cam 9, which is pushing the crown gear 24, preferably between two consecutive teeth 30, locks said rotation preventing the movement of the cable 3 and the wheel from falling to the ground. The case may arise in which the second end 15 of the cam 9 pushes the crown gear 24, not between two consecutive teeth 30, but in an intermediate position between said teeth 30. In said case, when the drive shaft 4 tries to rotate, all that happens is that either the locking is maintained because the pushing force of the spring 22 is greater than the rotary force of the crown gear 24, or the rotary force overcomes the force of the spring 22 and causes a slight movement of the crown gear 24 that positions the second end 15 between two consecutive teeth 30, it not moving from this position and maintaining the locking of the power shaft 50. The slight rotation caused either does not affect the falling of the cable or it is imperceptible, due to the reducing effect of the power shaft 50, which may, for example, be ⅛th, which means to say that the cable may move ⅛th of the corresponding sector in degrees to a tooth (for example, if the crown gear 24 has thirty two teeth 30, it would correspond to ⅛th of 5°, in other words a virtually insignificant amount). As a result, it may be seen that the safety device 6 locks the power shaft 50 regardless of its position of rotation.

In the implementation described above, the operating procedure of the unit for picking up spare wheels can involve two phases:

A first phase in which the end of the tool 5 is housed in the end 23 of the drive shaft 4, the safety device 6 moves to a non-active position, and the power shaft 50 may be rotated to wind or release the cable 3 and with it the wheel.

A second phase in which the tool 5 is withdrawn from the drive shaft 4 and the safety device 6 moves to the active position, the second end 15 of the cam 9 being positioned pushing against the crown gear 24, the power shaft 50 being itself in a passive locking situation for as long as its irreversibility does not fail and it starts to rotate, in which case the safety device 6 locks said rotation. As a result, the safety device 6 moves to the active position automatically when the tool 5 is withdrawn from the drive shaft 4.

In another implementation not shown in the figures, the safety device 6 comprises one more member, such as a lid or another member with the same function, which for example covers the end 23 of the drive shaft 4 and is related to the activation and deactivation of the cam 9 from the crown gear 24 of the drive shaft 4. In this implementation the phases involved in the operating procedure of the unit for picking up spare wheels may be:

A first phase in which the user firstly withdraws the lid or the similar member and uncovers the end 23 of the drive shaft 4, the safety device 6 moving to a non-active position, and may move the power shaft 50 by acting on it with the tool 5, winding or releasing the cable 3 and with it the wheel.

A second phase in which, the lid being disposed with an automatic restart mechanism such as a spring, when the tool 5 is withdrawn the lid closes to cover the end 23 of the drive shaft 4 once more, and the cam 9 is activated once again through its second end 15 against the crown gear 24. The power shaft 50 thus is itself in a passive-locking situation for as long as its irreversibility does not fail and it starts to rotate, in which case the safety device 6 locks said rotation. As in the first implementation, the safety device 6 automatically moves to an active position when the tool 5 is withdrawn from the drive shaft 4, the difference being that the movement to the non-active position in this second implementation is performed on opening the lid or the similar mechanism and not on housing the tool 5 in the drive shaft 4.

An added advantage of the unit is that it may be used with mechanisms that are disposed with a power shaft of any type, with the result that it is very versatile. It also allows customers buying these units to dispense with a safety device for supporting the main shaft with the wheel. If said additional safety device is dispensed with, the spare wheel would fall to the ground should the cable 3 break. However, said risk may be minimised by using a thicker cable 3, a sufficiently safe and cheaper alternative thereby being obtained.

What is claimed is:

1. An apparatus for storing a spare wheel on a motor vehicle comprising:
   a first mechanism attached to the motor vehicle comprising a support that is adapted to support the load of the spare wheel, the support moveable between a first vertical position where the spare wheel is in a stored position and a second vertical position lower than the first vertical position where the spare wheel is in an accessible position;
   a second mechanism comprising a winding assembly having a rotating shaft with a first end adapted to receive a tool, the rotating shaft rotatable upon the application of a rotational force applied by the tool, the rotating shaft comprising a gear with spaced-apart teeth circumferentially disposed about the rotating shaft;
   the first and second mechanisms coupled by a cable having a first end and a second end, the first end of the cable coupled to the support of the first mechanism, the second end of the cable coupled to the winding assembly of the second mechanism, the cable capable of being wound in the second mechanism upon a rotation of the rotating shaft in a first direction to move the support of the first mechanism towards the first vertical position, the cable capable of being unwound in the second mechanism upon a rotation of the rotating shaft in a second direction opposite the first direction to move the support of the first mechanism towards the second vertical position;
   the apparatus further comprising a safety device that is capable of assuming an active position and a non-active position, the safety device comprising a cam that is pivotable about an axis between a first angular position that corresponds to the active position and a second angular position that corresponds to the non-active position, in the first angular position an engaging portion of the cam is urged towards the gear of the rotating shaft by action of a spring element so that the engaging portion resides in a space between the spaced-apart teeth to prevent rotation of the rotating shaft in at least the second direction, in the second angular position the engaging portion of the cam is positioned away from the gear of the rotating shaft against the action of the spring element so that the engaging portion does not engage with the spaced-apart teeth to permit rotation of the rotation shaft in at least the second direction, the cam adapted to assume the second angular position when the tool is received on the first end of the rotating shaft, the cam comprising a first end portion and a second end portion, the pivot axis residing in the first end portion and the engaging portion forming a part of the second end portion, the first end portion of the cam comprising a projection situated to be acted upon and moved by the tool when the tool is received on the first end of the rotating shaft, the movement being in a direction that causes the cam to be urged against the action of the spring element towards the second angular position.

2. An apparatus according to claim 1, wherein the first end of the rotating shaft resides within a housing having an internal wall, there being a space between the internal wall of the housing and the rotating shaft sufficient for receiving therein the tool.

3. An apparatus according to claim 2, wherein when the cam is in the first angular position the projection resides in the space between the internal wall of the housing and the rotating shaft.

4. An apparatus according to claim 3, wherein the housing comprises a substantially cylindrical section that substantially surrounds the first end of the rotating shaft and two supports that project out of a lateral opening of the substantially cylindrical section, the cam and spring element residing at least partially between the two supports.

5. An apparatus according to claim 4, wherein the housing is attached to a cover of the second mechanism.

6. An apparatus according to claim 5, wherein the housing has a base with a plurality of flaps extending therefrom, the cover having a plurality of through openings that receive the plurality of flaps that effectuate the attachment of the housing to the cover.

7. An apparatus according to claim 3, wherein the housing comprises a substantially cylindrical section that surrounds the first end of the rotating shaft and two supports that project out of a lateral opening of the substantially cylindrical section and run along the height of the substantially cylindrical section, a substantial portion of each of the cam and spring element residing between the two supports when the cam is in the second angular position.

8. An apparatus according to claim 7, wherein the housing is attached to a cover of the second mechanism.

9. An apparatus according to claim 8, wherein the housing has a base with a plurality of flaps extending therefrom, the cover having a plurality of through openings that receive the plurality of flaps that effectuate the attachment of the housing to the cover.

10. An apparatus according to claim 1, wherein the first end of the rotating shaft resides within a housing that comprises a substantially cylindrical section having an internal wall that substantially surrounds the first end of the rotating shaft, there being a space between the internal wall and the rotating shaft sufficient for receiving therein the tool, the housing further comprising first and second supports that project out of a lateral opening of the substantially cylindrical section, each of the first and second supports having disposed therein respective first and second axially aligned through openings, the cam comprises a first end portion and a second end portion with a through opening that is aligned with the pivot axis of the cam extending through the first end portion, the engaging portion forming a part of the second end portion, the spring element forming a part of a spring unit that comprises a U-shaped member having a base and first and second lateral walls, the first and second lateral walls having disposed respectively therein axially aligned first and second through openings, the spring element being connected to and extending from the base, each of the first and second through openings of the first and second supports of the housing and the first and second lateral walls of the spring unit being aligned with the through opening in the first end portion of the cam with a shaft extending through each of the through openings to couple together the housing, cam and spring element.

11. An apparatus according to claim 10, wherein when the cam is in the first angular position the projection resides in the space between the internal wall of the housing and the rotating shaft.

12. An apparatus according to claim 11, wherein when the cam is in the first angular position the projection resides in the space between the internal wall of the housing and the rotating shaft and when the cam is in the second angular position a substantial portion of the projection resides between the first and second supports of the housing.

13. An apparatus according to claim 11, wherein the cam and spring unit reside at least partially between the first and second supports of the housing.

14. An apparatus according to claim 1, wherein the first end of the rotating shaft extends through a cover in the second mechanism and resides within a housing that is attached to the cover, the housing having an internal wall with there being a space between the internal wall of the housing and the rotating shaft sufficient for receiving therein the tool.

15. An apparatus according to claim 14, wherein the housing has a base with a plurality of flaps extending therefrom, the cover having a plurality of through openings that receive the plurality of flaps that effectuate the attachment of the housing to the cover.

16. An apparatus for storing a spare wheel on a motor vehicle comprising:
- a first mechanism attached to the motor vehicle comprising a support that is adapted to support the load of the spare wheel, the support moveable between a first vertical position where the spare wheel is in a stored position and second vertical position lower than the first vertical position where the spare wheel is in an accessible position;
- a second mechanism comprising a winding assembly having a rotating shaft with a first end adapted to receive a tool, the rotating shaft rotatable upon the application of a rotational force applied by the tool, the rotating shaft comprising a gear with spaced-apart teeth circumferentially disposed about the rotating shaft;
- the first and second mechanisms coupled by a cable having a first end and a second end, the first end of the cable coupled to the support of the first mechanism, the second end of the cable coupled to the winding assembly of the second mechanism, the cable capable of being wound in the second mechanism upon a rotation of the rotating shaft in a first direction to move the support of the first mechanism towards the first vertical position, the cable capable of being unwound in the second mechanism upon a rotation of the rotating shaft in a second direction opposite the first direction to move the support of the first mechanism towards the second vertical position;
- the apparatus further comprising a safety device that is capable of assuming an active position and a non-active position, the safety device comprising a cam that is pivotable about an axis between a first angular position that corresponds to the active position and a second angular position that corresponds to the non-active position, in the first angular position an engaging portion of the cam is urged towards the gear of the rotating shaft by action of a spring element so that the engaging portion resides in a space between the spaced-apart teeth to prevent rotation of the rotating shaft in at least the second direction, in the second angular position the engaging portion of the cam is positioned away from the gear of the rotating shaft against the action of the spring element so that the engaging portion does not engage with the spaced-apart teeth to permit rotation of the rotation shaft in at least the second direction, the spring element forms a part of a spring unit that comprises a U-shaped member having a base and first and second lateral walls, the first and second lateral walls having disposed respectively therein axially aligned first and second through openings, the spring element being connected to and extending from the base.

* * * * *